Figure 1:
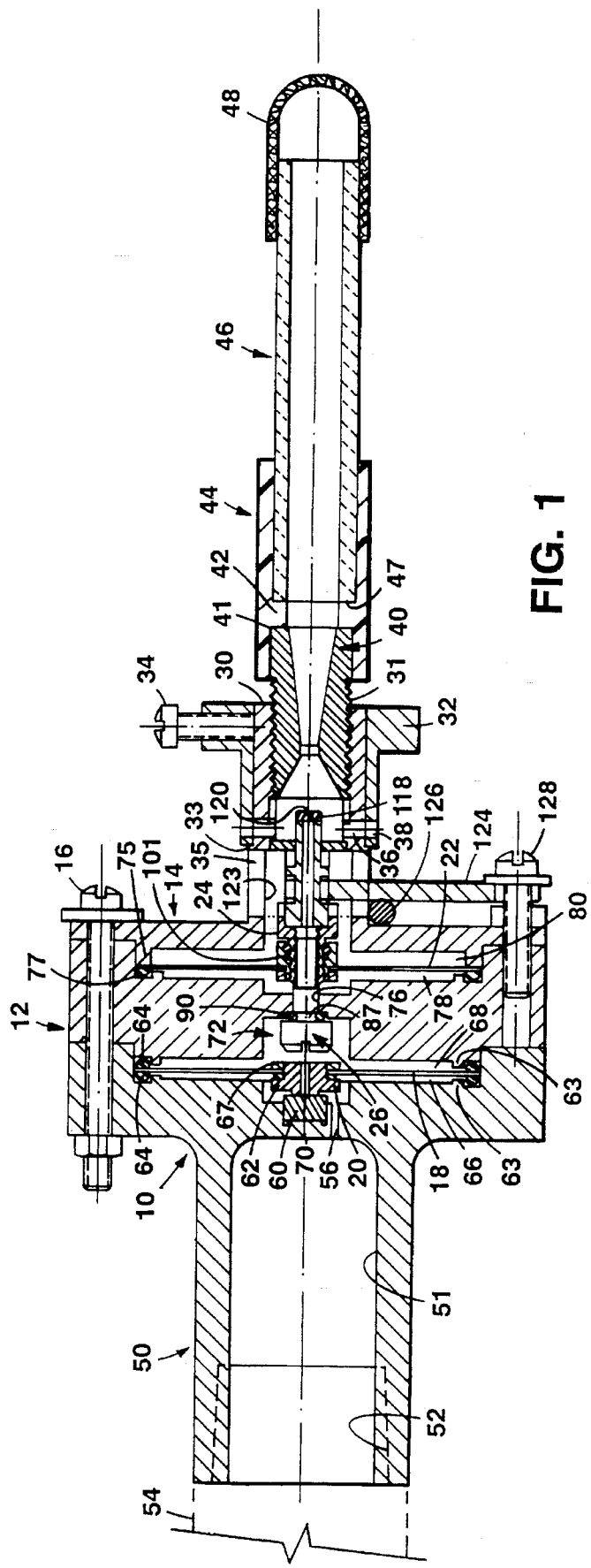

United States Patent [19]
Diederich

[11] Patent Number: 5,522,722
[45] Date of Patent: Jun. 4, 1996

[54] FUEL CONTROL

[75] Inventor: Walter J. Diederich, West Newbury, Mass.

[73] Assignee: Thermo Power Corporation, Waltham, Mass.

[21] Appl. No.: 338,000

[22] Filed: Nov. 10, 1994

[51] Int. Cl.$^6$ ............................................ F21H 1/00
[52] U.S. Cl. ...................... 431/89; 431/101; 137/614.2
[58] Field of Search ........................... 137/614.2; 431/89

[56] References Cited

U.S. PATENT DOCUMENTS

| | | |
|---|---|---|
| 2,002,884 | 5/1935 | Deming . |
| 2,642,083 | 6/1953 | Strong . |
| 2,662,348 | 12/1953 | Jacobsson . |
| 2,793,504 | 5/1957 | Webster . |
| 2,854,991 | 10/1958 | Webster . |
| 3,118,494 | 1/1964 | Yost et al. . |
| 3,183,686 | 5/1965 | Tissot-Dupont . |
| 3,388,962 | 6/1968 | Baumann et al. . |
| 3,699,998 | 10/1972 | Baranowski, Jr. . |
| 3,711,236 | 1/1973 | Kinsella et al. . |
| 3,736,093 | 5/1973 | Bowman et al. . |
| 3,812,877 | 5/1974 | Fleischhacker et al. . |
| 3,941,554 | 3/1976 | Curtis . |
| 3,955,913 | 5/1976 | Benzaria . |
| 4,003,694 | 1/1977 | Lowell . |
| 4,273,150 | 6/1981 | Paduch et al. . |
| 4,497,339 | 2/1985 | Gruner et al. . |
| 5,018,963 | 5/1991 | Diederich . |

*Primary Examiner*—Carroll B. Dority
*Attorney, Agent, or Firm*—Fish & Richardson

[57] ABSTRACT

A fuel control system for use with a source of pressurized fuel includes housing structure defining an inlet, an outlet, a check valve chamber and a regulating valve chamber disposed between the inlet and outlet structures. Check valve structure is disposed in the check valve chamber for preventing liquid fuel from reaching the outlet structure, and control valve structure is disposed in the regulating valve chamber. The control valve structure includes diaphragm structure dividing the regulating valve chamber into a downstream chamber open to atmospheric pressure and an upstream chamber on the opposite side of the diaphragm structure that is in communication with the check valve chamber. Regulator valve structure is coupled to the diaphragm structure for movement between a first position in which the valve passage is open to permit flow of fuel from the check valve chamber to the outlet structure and a second position in which the valve passage is closed; and includes adjustment structure for shifting the regulator valve structure relative to the diaphragm structure for changing the pressure on the diaphragm structure that will cause the regulator valve structure to move between the first and second positions.

33 Claims, 2 Drawing Sheets

FUEL CONTROL

This invention relates to fuel control systems and more particularly to regulators of the type useful for connecting a portable gas appliance such as a flashlight or gas torch to a fuel supply reservoir and controlling fuel vapor flow rate to the gas appliance.

In such appliances, a controller desirably controls the rate of flow of fuel from the fuel supply and shuts off the fuel supply when desired. It is also necessary to substantially reduce the pressure of liquified fuel as it passes out of the supply to the gas appliance and to aid in vaporization of liquified fuel. In many such appliances, the operating characteristics of the appliance may change widely depending on the operating temperature and the orientation of the fuel supply. If liquid fuel is passed to the appliance without complete vaporization, a markedly increased burn rate may result. Also, if the liquid fuel with a small amount of entrained impurity such as paraffin in solution passes through the control system, a downstream orifice may be clogged or permanently disabled.

In accordance with one aspect of the invention, there is provided a fuel control system for use with a source of pressurized fuel includes housing structure defining an inlet, an outlet, a check valve chamber and a regulating valve chamber disposed between the inlet and outlet structures. First (check) valve structure is disposed in the check valve chamber for preventing liquid fuel from reaching the outlet structure, and second (control) valve structure is disposed in the regulating valve chamber. The second valve structure includes regulator diaphragm structure dividing the regulating valve chamber into a downstream chamber open to atmospheric pressure and an upstream chamber on the opposite side of the diaphragm structure that is in communication with the check valve chamber. Regulator valve structure is coupled to the regulator diaphragm structure for movement between a first position in which the valve passage is open to permit flow of fuel from the check valve chamber to the outlet structure and a second position in which the valve passage is closed; and includes adjustment structure for shifting the regulator valve structure relative to the regulator diaphragm structure for changing the pressure across the regulator diaphragm structure that will cause the regulator valve structure to move between the first and second positions.

Preferably, the first valve structure includes a check valve diaphragm member disposed in the check valve chamber that divides that check valve chamber into upstream and downstream chambers. Check valve structure is carried by the check valve diaphragm and valve seat structure is disposed in the upstream check valve chamber, the check valve structure being adapted to close when the pressure differential between the upstream and downstream check valve chambers is less than a predetermined value such that fuel does not flow from the upstream check valve chamber to the downstream check valve chamber. In a particular embodiment the check valve pressure differential that causes the check valve structure to close is in the range of 5–12 pounds per square inch.

In a particular embodiment, the regulator valve structure adjustment structure includes a threaded member carried by the regulator diaphragm and coupling structure threadedly connected to the threaded member. The regulator valve structure is carried by the coupling structure and rotation of the coupling structure relative to the regulator diaphragm structure axially shifts the position of the regulator valve structure relative to the diaphragm structure.

Preferably, the check valve diaphragm and the regulator valve diaphragm are of metallic material, a particularly preferred material being stainless steel, although other materials, including polymeric material may be used in particular embodiments. In a particular embodiment, restricted flow structure connects the inlet structure and the check valve chamber, the restricted flow structure in a particular embodiment being a passage of about 0.3 millimeter diameter and a length of about two millimeters.

In accordance with another aspect, there is provided a control system for use with a source of pressurized fuel that includes housing structure defining inlet structure for receiving fuel from a source of pressurized fuel, outlet structure, and check valve chamber structure and regulator valve chamber structure between the inlet and outlet structures. First (check) valve structure is disposed in the check valve chamber for preventing liquid fuel from reaching the outlet structure, the first valve structure including metallic check valve diaphragm structure that divides the check valve chamber into upstream and downstream chambers, a check valve member carried by the check valve diaphragm, and valve seat structure disposed in the upstream check valve chamber. The check valve is adapted to close when the pressure differential between the upstream check valve chamber and the downstream check valve chamber is less than a predetermined value so that fuel does not flow from the upstream check valve chamber to the downstream check valve chamber. Second (control) valve structure is disposed in the regulator valve chamber and includes metallic regulator valve diaphragm structure that is disposed generally parallel to the check valve diaphragm structure and divides the regulator valve chamber into a downstream regulator valve chamber open to atmospheric pressure and an upstream regulator valve chamber on the opposite side of the regulator valve diaphragm structure from the downstream regulator valve chamber and in communication with the downstream check valve chamber through first passage structure. Second passage structure connects the regulator valve upstream chamber and the outlet structure, and regulator valve structure is coupled to the regulator valve diaphragm structure for movement between a first position in which the first passage structure is open to permit flow of vaporized fuel from the check valve chamber through the first passage structure to the outlet structure and a second position in which the first passage structure is closed. Preferably, each of the upstream and downstream check valve chambers has a depth that is less than one tenth the width of the check valve chamber; and in a particular embodiment, each of the upstream and downstream check valve chambers has a depth of less than one millimeter.

Figure 2:
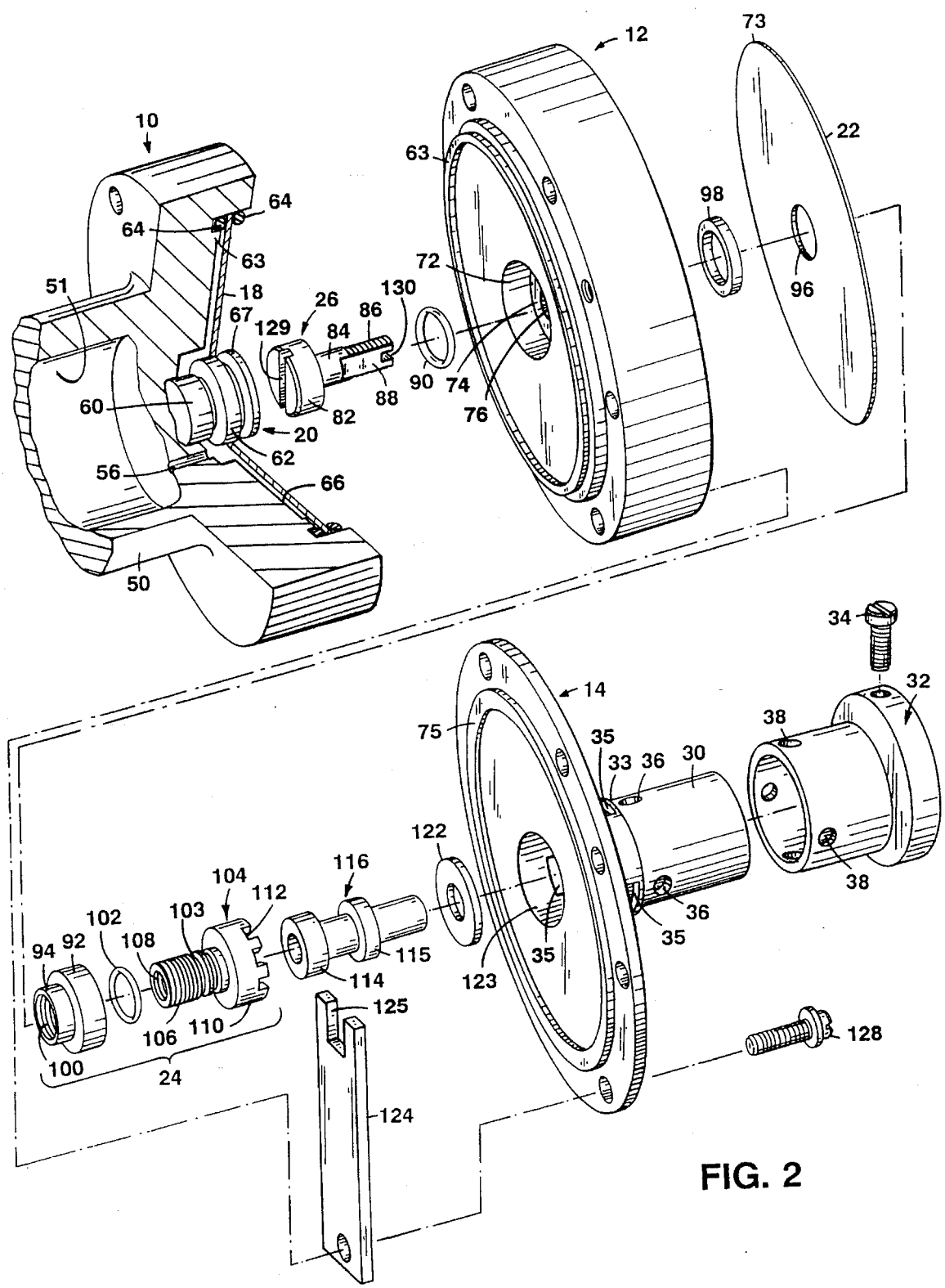

Other features and advantages of the invention will be seen as the following description of a particular embodiment progresses, in conjunction with the drawings, in which:

FIG. 1 is a sectional view of gas flow control apparatus in accordance with the invention; and FIG. 2 is an exploded perspective view of components of the gas flow control apparatus shown in FIG. 1.

DESCRIPTION OF PARTICULAR EMBODIMENT

The flow control apparatus shown in FIG. 1 includes housing structure with base member 10, intermediate member 12, and cap member 14 that are secured together with bolts 16. Secured between members 10 and 12 is stainless steel diaphragm 18 that carries a first (check valve) assembly 20; and secured between housing members 12 and 14 is stainless steel diaphragm 22 that carries coupling assembly 24 to which regulator valve member 26 of a second valve assembly is threadedly attached.

Cap member 14 includes tubular extension portion 30 with internal thread 31 (FIG. 2) and shoulder 33 on which is disposed sleeve 32. Sleeve 32 is seated against shoulder 33 and is secured in angular position with set screw 34. Apertures 35 (FIG. 2) in extension portion 30 allow insertion of a regulator valve adjustment tool for axially adjusting the position of regulator valve member 26 relative to valve seat 74 in valve-open position. Ports 36 in extension portion 30 cooperate with ports 38 in sleeve 32 for adjusting aspirated air inlet port area. Threadedly disposed within extension 30 is Venturi 40 and seated on leading edge 41 of Venturi 40 is internal flange 42 of elastomeric coupling member 44. Mullite tube 46 has trailing end 47 received within coupling 44 and seated on flange 42. Received on the remote end of mullite tube 46 is refractory metal oxide fabric gas mantle 48 of the type disclosed in Nelson U.S. Pat. No. 4,976,606 for use in a thermophotovoltaic system, whose disclosure is incorporated herein by reference. This fuel control system is adapted for use in a portable light source of the general type shown in Diederich U.S. Pat. Nos. 4,975,044 and 5,240,407, the disclosures of which are incorporated herein by reference.

Base member 10 includes tubular structure 50 that defines an inlet fuel passage 51 of about one centimeter diameter and that includes screw threads 52 for connection to a suitable container (diagrammatically indicated at 54) of liquified fuel such as propane that has a pressure of about 100 psi at room temperature. Formed at the inner end of the inlet passage 51 is restricted flow passage 56 of about 0.3 millimeter diameter and a length of about two millimeters. In an alternate embodiment, a porous metal filter having flow characteristics similar to passage 56 may be utilized to provide a restricted flow passage from the inlet passage 51 to the upstream side of check valve diaphragm 18. Formed in base member 10 adjacent the outlet of passage 56 is recess 58 that receives resilient check valve seat member 60 that cooperates with check valve disc member 62 carried by diaphragm 18.

Diaphragm 18 is a stainless steel disk that is about 0.1 millimeter thick and has a diameter of about two centimeters and is seated between base member 10 and intermediate member 12 with its peripheral portion disposed between circumferential ridges 63 and sealed by O-rings 64. Secured to the center of diaphragm 18 by press fit metal ring 67 is check valve member 62 that has through passage 70 of about one-half millimeter diameter and about two millimeters length. Upstream check valve chamber 66 has a depth of about one-tenth millimeter and a diameter of about 1.8 centimeters and downstream check valve chamber 68 has a diameter dimension similar to that of upstream chamber 66 and a depth of about one-half millimeter. The small depth dimension of chamber 66 prevents damage to diaphragm 18 when fuel container 54 is removed.

With reference to FIGS. 1 and 2, formed in downstream check valve chamber 68 is recess 72 at the base of which is formed valve seat 74 and through passage 76 of about 1.5 millimeter diameter in which is disposed the stem portion 84 of valve member 26 with a diametrical clearance of about 0.05 millimeter. Secured between intermediate member 12 and cap member 14 is stainless steel diaphragm 22 which cooperates with intermediate member 12 to define regulating valve chamber 78 of about ½ millimeter depth and about 1.7 centimeters diameter, and cooperates with cap member 14 to define chamber 80 which is open to atmosphere through apertures 35. The peripheral edge 73 of diaphragm 22 is secured between annular ridge 75 of cap member 14 and sealing O-ring 77 carried by intermediate member 12.

Carried by diaphragm 22 is coupling assembly 24 to which regulator valve member 26 is threadedly attached. Valve member 26 has head portion 82 and a shank portion that has slot 130 at its end, cylindrical stem portion 84 and threaded section 86 with flat 88 that extends beyond the length of threaded section 86. Received in groove 87 at the base of head portion 82 is O-ring 90 that is adapted to seat against valve seat 74 when the regulator valve 26 is closed to block flow of fuel from check valve chamber 68. When valve 26 is closed, regulating valve chamber 78 remains open through valve flat 88 and slot 130 so that pressure in chamber 78 bleeds off through orifice holder 116 and orifice 120.

Coupling assembly 24 (as shown in FIG. 2) includes coupling ring member 92 with portion 94 that is received in aperture 96 of diaphragm 22 and secured with press fit ring 98. Coupling ring 92 has internal thread 100 and internal annular recess 101 which receives seal ring 102 carried in groove 103 of cooperating coupling member 104 that has external thread 106 that engages internal thread 100. Member 106 also has internal thread 108 which threadedly receives threaded shank 86 of valve member 26, head portion 110 with crenelated portion 112 and a socket portion which receives head portion 114 of brass orifice holder 116 that carries jewel (sapphire) 118 that defines a metering orifice 120 about 0.05 millimeter diameter. Ring 122 centers orifice holder 116 within recess 123 in tubular extension 30 of cap member 14.

Threadedly received in extension 30 is Venturi member 40 that delivers an air-fuel ratio of up to about 25:1 (as a function of angular adjustment of sleeve 32); and seated on the leading edge 41 of Venturi 40 is flange 42 of resilient coupling sleeve 44. Tubular mullite member 46 of six millimeters diameter and twenty-five millimeters length has its trailing end 47 inserted in resilient coupling 42 and refractory metal oxide fabric gas mantle 48 is mounted on the remote end of mullite tube 46.

The forked end 125 of control lever 124 is received between head 114 and flange 115 for coupling to orifice holder 116 and is pivoted on pin 126 and engaged by the control bolt 128 for axially shifting the regulator valve assembly 24 between a closed position in which O-ring 90 is seated on valve seat 74 and an open position in which O-ring 90 is spaced from seat 74. The fuel vapor flow rate is adjustable over a range of about ten–twenty cubic centimeters per minute.

In operation, a tank 54 of liquified propane fuel (at a pressure of about 100 psi at room temperature) is attached to tubular inlet 50. The liquified propane fuel fills inlet fuel passage 51, flows through restricted passage 56 and is vaporized in upstream check valve chamber 66. When the fuel is in vaporized form in downstream check valve chamber 68, the check valve is open in response to a pressure differential in the range of 5–12 psi across diaphragm 18. Should liquified fuel begin to flow through check valve passage 70 into chamber 68, the pressure in chamber 68 will immediately reduce the pressure differential across diaphragm 18 and cause check valve 20 to close instantly. Valve 20 will remain closed until the fuel in chamber 68 is fully vaporized and the pressure in downstream chamber 68 is sufficiently reduced so that the bias force of diaphragm 18 is overcome.

Regulator valve 26 is normally biased to an open position by diaphragm 22 and is manually closed by action of coupling lever 124 against flange 115 of orifice holder 116 to move valve member 26 axially and seat O-ring 90 on valve seat 74 to close valve 26. On release of control lever 124, diaphragm 22 moves coupling assembly 24 to open the regulator valve 26.

The pressure in valve chamber 78 (which establishes the pressure which will close valve 26 and thus the flow rate through orifice 120) is adjusted by rotating coupling member 104 through engagement of crenelated head portion 112 with an adjustment tool inserted through an aperture 35 in tubular extension 30. Rotation of coupling member 104 (which carries valve member 26) shifts the valve subassembly 26 relative to support ring 92 and diaphragm 22 to adjust the spacing of O-ring 90 from valve seat 74 when the diaphragm 22 is in neutral (valve open) position, thus providing adjustment of the flow rate (over a range of about ten–twenty cubic centimeters per minute) through orifice 120. Slot 129 in head portion 86 of valve member 26 allows firm seating of member 26 in coupling member 104 during system assembly.

Fuel vapor flows from the regulating valve chamber 78, and through the passage defined by shank side wall flat 88 and end slot 130 into the central passage of orifice holder 116 for flow through metering orifice 120. That fuel flow entrains air introduced through ports 36 for flow through Venturi 40 and the fuel/air mixture flows through mullite tube 46 to gas mantle 48 for ignition. Should the fuel pressure in chamber 78 increase sufficiently to flex diaphragm 22, valve 26 will close and remain closed until the continuing fuel flow through flat 88, slot 130 and orifice 120 reduces that pressure in chamber 78 such that the valve 26 will reopen and allow fuel flow through valve passage 76 to resume.

Should liquid propane pass through check valve passage 70 into downstream check valve chamber 68, the pressure in chamber 68 immediately rises and slams check valve 20 closed. Valve 20 remains closed until the liquid fuel in check valve chamber 68 is vaporized and then reopens automatically to allow continued fuel flow through the check valve to mantle 48.

While a particular embodiment of the invention has been shown and described, various modifications will be apparent to those skilled in the art, and therefore it is not intended that the invention be limited to the disclosed embodiment, or to details thereof, and departures may be made therefrom within the spirit and scope of the invention.

What is claimed is:

1. A control system for use with a source of pressurized fuel comprising housing structure defining inlet structure for receiving fuel from a source of pressurized fuel, outlet structure, check valve chamber structure, regulator valve chamber structure disposed between said inlet and outlet structures, first passage structure connecting said check valve chamber and said regulator valve chamber, first valve structure disposed in said check valve chamber for preventing liquid fuel from reaching said outlet structure, second valve structure disposed in said regulator valve chamber, said second valve structure including regulator diaphragm structure dividing said regulator valve chamber into a downstream chamber open to atmospheric pressure and an upstream chamber on the opposite side of said diaphragm structure from said downstream chamber and in communication with said check valve chamber through said first passage structure, second passage structure connecting said upstream chamber and said outlet structure, regulator valve structure coupled to said regulator diaphragm structure for axial movement between a first position in which said first passage structure is open to permit flow of vaporized fuel from said check valve chamber through said first passage structure to said outlet structure and a second position in which said first passage structure is closed, and adjustment structure for shifting said regulator valve structure relative to said regulator diaphragm structure for changing the pressure on said regulator diaphragm structure that will cause said regulator valve structure to move between said first and second positions.

2. The system of claim 1 wherein said first valve structure includes a check valve diaphragm member disposed in said check valve chamber that divides said check valve chamber into upstream and downstream chambers, check valve structure carried by said check valve diaphragm, and valve seat structure disposed in said upstream check valve chamber, said check valve structure being adapted to close when the pressure differential between said upstream check valve chamber and said downstream check valve chamber is less than a predetermined value so that fuel does not flow from said upstream check valve chamber to said downstream check valve chamber.

3. The system of claim 2 wherein said check valve pressure differential that causes said check valve structure to close is in the range of five to twelve pounds per square inch.

4. The system of claim 1 wherein said adjustment structure includes a threaded member carried by said regulator diaphragm structure, and coupling structure threadedly connected to said threaded member, said regulator valve structure being carried by said coupling structure such that rotation of said coupling structure relative to said regulator diaphragm structure axially shifts the position of said regulator valve structure relative to said regulator diaphragm structure.

5. The system of claim 4 wherein said coupling structure includes an actuating portion for moving said regulator valve structure to said second position.

6. The system of claim 1 and further including Venturi structure in said outlet structure for delivering an air fuel mixture.

7. The system of claim 6 and further including metal oxide fabric mantle structure mounted on said outlet structure.

8. The system of claim 1 wherein said first valve structure includes resilient seat structure mounted on said housing structure, check valve diaphragm structure dividing said check valve chamber into an upstream chamber in which said resilient seat structure is mounted and a downstream chamber on the opposite side of said check valve diaphragm structure from said upstream chamber, and a check valve member having a check valve passage, said check valve member being movable between a first position in which said check valve passage is open to permit flow of fuel from said upstream check valve chamber to said downstream check valve chamber and a second position in which said check valve passage is closed by seating of said check valve member on said resilient seat structure.

9. The system of claim 8 wherein said check valve diaphragm is of metallic material.

10. The system of claim 9 wherein said metallic diaphragm material is stainless steel.

11. The system of claim 1 and further including restricted flow structure connecting said inlet structure and said check valve chamber.

12. The system of claim 11 wherein said restricted flow structure is a passage of about 0.3 millimeter diameter and a length of about 2 millimeters.

13. The system of claim 1 and further including manually operable control structure for moving said regulator valve structure between said first and second positions.

14. The system of claim 13 wherein said first valve structure includes a check valve diaphragm disposed in said check valve chamber that divides said check valve chamber into upstream and downstream chambers, check valve structure carried by said check valve diaphragm, and valve seat structure disposed in said upstream check valve chamber, said check valve structure being adapted to close against said valve seat structure when the pressure differential between said upstream check valve chamber and said downstream check valve chamber is less than a predetermined value so that fuel does not flow from said upstream check valve chamber to said downstream check valve chamber.

15. The system of claim 14 wherein said housing structure includes a base member that defines said inlet structure, a cap member that defines said outlet structure, and intermediate structure connected between said base and cap members, said check valve diaphragm is disposed between said base member and said intermediate structure, and said regulator diaphragm structure is supported by said intermediate structure in generally parallel relation to said check valve diaphragm.

16. The system of claim 15 wherein each of said diaphragm members is of metallic material.

17. The system of claim 16 and further including Venturi structure in said outlet structure for delivering an air fuel mixture.

18. The system of claim 17 and further including metal oxide fabric mantle structure mounted on said outlet structure.

19. The system of claim 15 wherein said adjustment structure includes a threaded member carried by said regulator diaphragm structure, and coupling structure threadedly connected to said threaded member, said regulator valve structure being carried by said coupling structure such that rotation of said coupling structure relative to said regulator diaphragm structure axially shifts the position of said regulator valve structure relative to said regulator diaphragm structure.

20. The system of claim 19 wherein said coupling structure includes an actuating portion for moving said regulator valve structure to said second position.

21. The system of claim 20 and further including metal oxide fabric mantle structure mounted on said outlet structure.

22. The system of claim 21 and further including Venturi structure in said outlet structure for delivering an air fuel mixture to said mantle structure.

23. A control system for use with a source of pressurized fuel comprising housing structure defining inlet structure for receiving fuel from a source of pressurized fuel, outlet structure, check valve chamber structure, regulator valve chamber structure between said inlet and outlet structures, first valve structure disposed in said check valve chamber for preventing liquid fuel from reaching said outlet structure, said first valve structure including metallic check valve diaphragm structure disposed in said check valve chamber that divides said check valve chamber into upstream and downstream chambers, check valve structure carried by said check valve diaphragm structure, and valve seat structure disposed in said upstream check valve chamber, said check valve structure being adapted to close when the pressure differential between said upstream check valve chamber and said downstream check valve chamber is less than a predetermined value so that fuel does not flow from said upstream check valve chamber to said downstream check valve chamber, second valve structure disposed in said regulator valve chamber, said second valve structure including metallic regulator valve diaphragm structure disposed generally parallel to said check valve diaphragm structure and dividing said regulator valve chamber into a downstream regulator valve chamber open to atmospheric pressure and an upstream regulator valve chamber on the opposite side of said regulator valve diaphragm structure from said downstream regulator valve chamber and in communication with said downstream check valve chamber through first passage structure, second passage structure connecting said regulator valve upstream chamber and said outlet structure, and regulator valve structure coupled to said regulator valve diaphragm structure for axial movement between a first position in which said first passage structure is open to permit flow of vaporized fuel from said check valve chamber through said first passage structure to said outlet structure and a second position in which said first passage structure is closed.

24. The system of claim 23 wherein each of said upstream and downstream check valve chambers has a depth that is less than one tenth the width of said check valve chamber.

25. The system of claim 24 wherein each of said upstream and downstream check valve chambers has a depth of less than one millimeter.

26. The system of claim 23 and further including adjustment structure for shifting said regulator valve structure relative to said regulator valve diaphragm structure for changing the pressure on said regulator valve diaphragm structure that will cause said regulator valve structure to move between said first and second positions.

27. The system of claim 26 wherein said adjustment structure includes coupling structure, said regulator valve structure being carried by said coupling structure such that movement of said coupling structure relative to said regulator valve diaphragm structure axially shifts the position of said regulator valve structure relative to said regulator valve diaphragm structure.

28. The system of claim 27 wherein said coupling structure includes an actuating portion for manually moving said regulator valve structure to said second position.

29. The system of claim 28 and further including metal oxide fabric mantle structure mounted on said outlet structure.

30. The system of claim 29 and further including Venturi structure in said outlet structure for delivering an air fuel mixture to said mantle structure.

31. The system of claim 30 wherein each of said upstream and downstream check valve chambers has a depth of less than one millimeter.

32. The system of claim 31 and further including restricted flow structure connecting said inlet structure and said check valve chamber.

33. The system of claim 32 wherein the pressure differential that causes said check valve structure to close is in the range of five to twelve pounds per square inch.

* * * * *